United States Patent
Lee

(10) Patent No.: US 10,166,879 B2
(45) Date of Patent: Jan. 1, 2019

(54) BATTERY DISCHARGE PREVENTING SYSTEM FOR HYBRID VEHICLE AND BATTERY DISCHARGE PREVENTING METHOD USING THE SAME

(71) Applicant: MANDO CORPORATION, Pyeongtaek-si, Gyeonggi-do (KR)

(72) Inventor: Young Ok Lee, Seoul (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 345 days.

(21) Appl. No.: 14/687,194

(22) Filed: Apr. 15, 2015

(65) Prior Publication Data

US 2015/0303716 A1    Oct. 22, 2015

(30) Foreign Application Priority Data

Apr. 16, 2014    (KR) .................. 10-2014-0045500

(51) Int. Cl.
*B60L 11/18*    (2006.01)
*H02J 7/00*    (2006.01)

(52) U.S. Cl.
CPC ....... *B60L 11/1861* (2013.01); *B60L 11/1859* (2013.01); *B60L 11/1862* (2013.01); *B60L 11/1868* (2013.01); *H02J 7/0026* (2013.01); *H02J 7/0054* (2013.01); *H02J 7/0081* (2013.01); *B60L 2240/547* (2013.01); *Y02T 10/7005* (2013.01); *Y02T 10/7044* (2013.01); *Y02T 10/7055* (2013.01); *Y02T 10/7066* (2013.01)

(58) Field of Classification Search
CPC .............. B60L 11/1868; B60L 11/1816; B60L 11/1838; B60L 11/1861; B60L 11/1862
USPC ..... 307/10.1, 9.1, 10.6, 10.7, 10.8; 320/103, 320/104, 134–140, 149, 162–164, 125, 320/127, 128
See application file for complete search history.

(56) References Cited

U.S. PATENT DOCUMENTS

2007/0026711 A1* 2/2007 Chorian ................ B60K 28/14
                                                    439/174
2009/0015193 A1    1/2009 Esaka et al.
(Continued)

FOREIGN PATENT DOCUMENTS

CN    101160688 A    4/2008
CN    202480896 U    10/2012
(Continued)

OTHER PUBLICATIONS

Chinese Office Action dated Oct. 21, 2016 in connection with the counterpart Chinese Patent Application No. 201510181202.5, citing the above reference(s).

*Primary Examiner* — Thomas Skibinski
(74) *Attorney, Agent, or Firm* — Hauptman Ham, LLP

(57) ABSTRACT

Disclosed herein is a battery discharge preventing system for a hybrid vehicle including a high voltage battery that drives a motor of the vehicle, a low voltage battery that supplies power to a black box, a first voltage sensor that measures a voltage level of the low voltage battery, a converter that charges the low voltage battery using the high voltage battery, a first relay that selectively regulates a current path between the high voltage battery and the converter, and a control unit that controls the first relay according to a measurement value of the first voltage sensor.

6 Claims, 4 Drawing Sheets

(56) References Cited

U.S. PATENT DOCUMENTS

| | | | |
|---|---|---|---|
| 2010/0244782 A1* | 9/2010 | Nagayama | B60L 11/1868 320/162 |
| 2011/0106336 A1* | 5/2011 | Eikeland | B60L 11/1824 701/2 |
| 2012/0150393 A1* | 6/2012 | Knight-Newbury | B60L 3/04 701/45 |
| 2013/0187590 A1 | 7/2013 | Ferrel et al. | |

FOREIGN PATENT DOCUMENTS

| CN | 103213510 A | 7/2013 |
|---|---|---|
| KR | 1020110120635 A | 11/2011 |

\* cited by examiner

BATTERY DISCHARGE PREVENTING SYSTEM FOR HYBRID VEHICLE AND BATTERY DISCHARGE PREVENTING METHOD USING THE SAME

CROSS-REFERENCE TO RELATED APPLICATION

This application claims priority to and the benefit of Korean Patent Application No. 10-2014-0045500, filed on Apr. 16, 2014, the disclosure of which is incorporated herein by reference in its entirety.

BACKGROUND

1. Field of the Invention

The present invention relates to a battery discharge preventing system for a hybrid vehicle, and a battery discharge preventing method using the same, and more particularly, to a battery discharge preventing system for a hybrid vehicle that charges a low voltage battery through selective connection of a relay device to prevent the low voltage battery from discharging, and a battery discharge preventing method using the same.

2. Discussion of Related Art

In recent years, persons who mount and use black boxes in their vehicles in order to prevent traffic accidents and secure evidence have been significantly increasing. Such black boxes are operated by receiving a power supply when a vehicle is operated, but the operation of the black box is interrupted when the engine of the vehicle is stopped and an ACC power supply is turned off.

Here, many persons desire to monitor the state of the vehicle even while the vehicle is stopped or parked, and therefore black boxes are often connected to permanent power supplies to be driven and used even when the ACC power supply is turned off.

However, when a black box is left in a state in which power is supplied for a long time, a low voltage battery of the vehicle is highly likely to be discharged. Thus, there is a problem that it is difficult to operate a block box for a long time.

A separate auxiliary battery may be purchased and mounted in order to overcome this problem, but there is a problem that a burden increases because the auxiliary battery is expensive.

Thus, there are demands for a method for solving the above-mentioned problems.

SUMMARY OF THE INVENTION

The present invention is directed to a battery discharge preventing system for a hybrid vehicle and a battery discharge preventing method using the same which may enable long time operation of a black box while parking and stopping of a vehicle.

The present invention is also directed to a battery discharge preventing system for a hybrid vehicle and a battery discharge preventing method using the same which may solve a battery discharge problem according to operation of a black box.

The present invention is also directed to a battery discharge preventing system for a hybrid vehicle and a battery discharge preventing method using the same which may be implemented without consuming extra costs.

According to an aspect of the present invention, there is provided a battery discharge preventing method for a hybrid vehicle including: measuring, by a first voltage sensor, a voltage level of a low voltage battery for supplying power to a black box; and supplementing, by a control unit, power of the low voltage battery using a high voltage battery by connecting a first relay, when the voltage level of the low voltage battery is a first reference value or less.

The battery discharge preventing method may further include, between the measuring of the voltage level of the low voltage battery and the supplementing of the power of the low voltage battery, determining a voltage level of the high voltage battery, wherein the supplementing of the power of the low voltage battery is performed when the voltage level of the high voltage battery is determined to be a second reference value or more in the determining of the voltage level of the high voltage battery.

The battery discharge preventing method may further include, after the supplementing of the power of the low voltage battery, measuring a voltage level of the high voltage battery, and cancelling, by the control unit, connection of the first relay, when the voltage level of the high voltage battery is a second reference value or less.

The high voltage battery may supply a power supply to an inverter to drive a motor of the vehicle, and a second relay may be disposed in a path connecting the high voltage battery and the inverter, and the battery discharge preventing method may further include, after the supplementing of the power of the low voltage battery, cancelling, by the control unit, at least one of connection of the first relay and connection of the second relay, when collision of the vehicle is detected by an impact sensor mounted in the vehicle.

According to another aspect of the present invention, there is provided a battery discharge preventing system for a hybrid vehicle including: a high voltage battery that drives a motor of the vehicle; a low voltage battery that supplies power to a black box; a first voltage sensor that measures a voltage level of the low voltage battery; a converter that charges the low voltage battery using the high voltage battery; a first relay that selectively regulates a current path between the high voltage battery and the converter; and a control unit that controls the first relay according to a measurement value of the first voltage sensor.

The battery discharge preventing system may further include a second voltage sensor that measures a voltage level of the high voltage battery, wherein the control unit controls the first relay by reflecting a measurement value of the second voltage sensor.

The battery discharge preventing system may further include an impact sensor that detects collision of the vehicle, wherein the control unit controls the first relay by reflecting a measurement value of the impact sensor.

The battery discharge preventing system may further include an inverter that receives a power supply from the high voltage battery and drives the motor of the vehicle and a second relay that selectively regulates a current path between the high voltage battery and the inverter, wherein the control unit controls at least one of the first relay and the second relay by reflecting the measurement value of the impact sensor.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
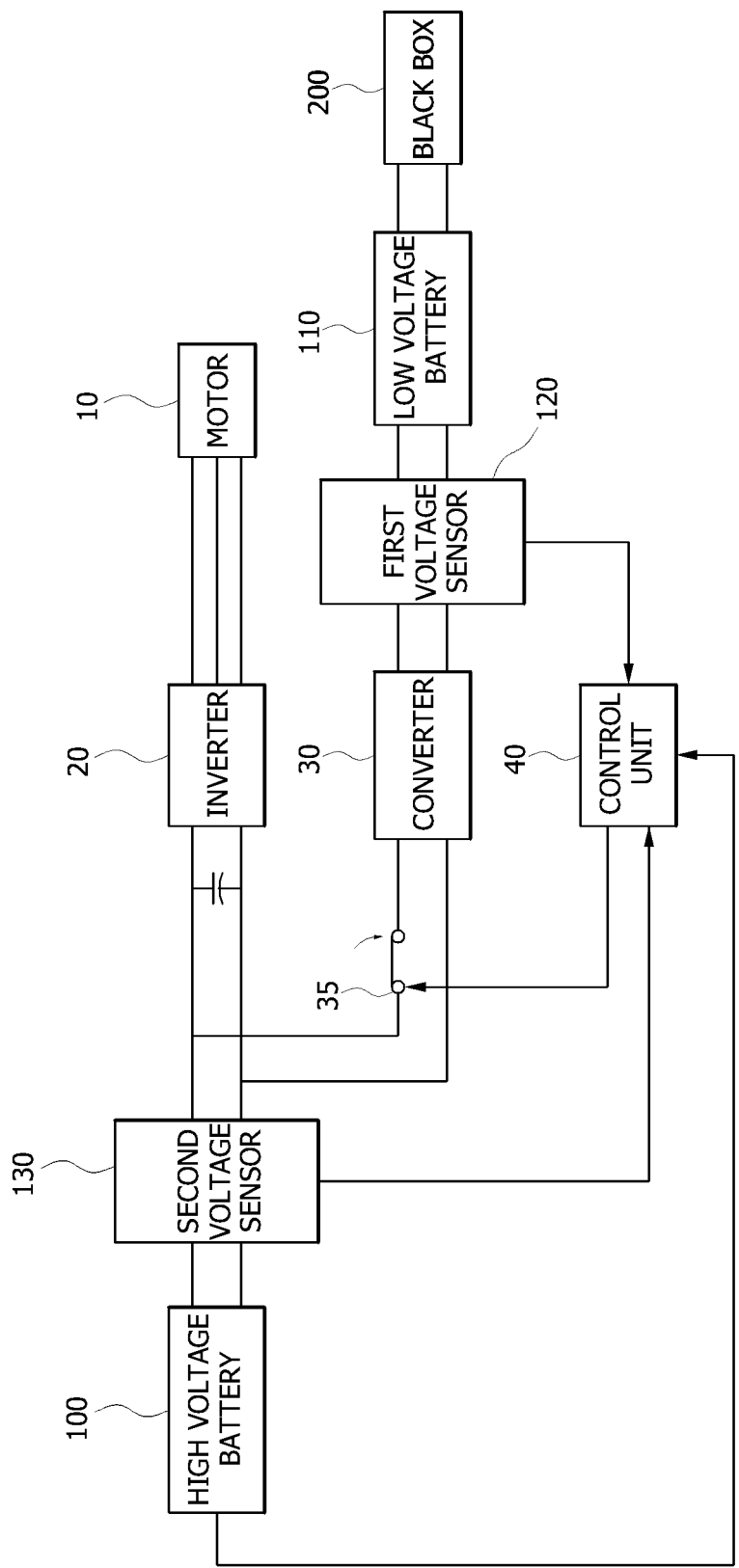
FIG. 1 is a view showing each component of a battery discharge preventing system for a hybrid vehicle according to a first embodiment of the present invention.
Figure 2:
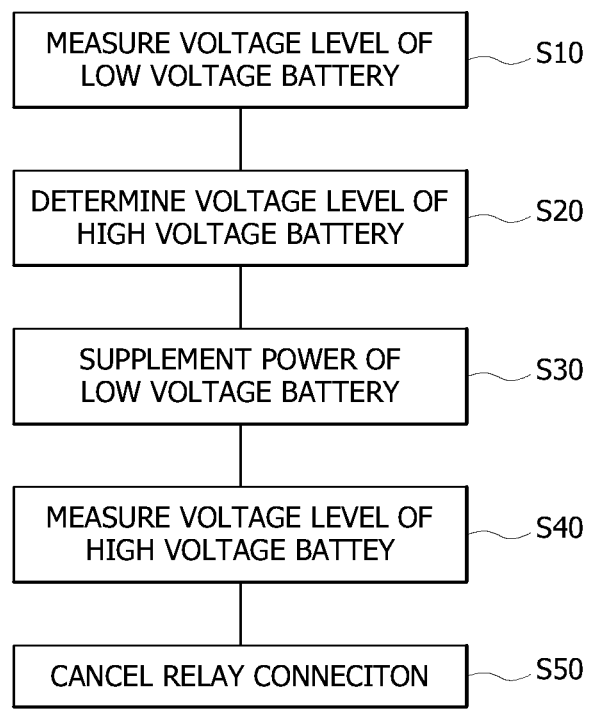
FIG. 2 is a flowchart showing each operation of a battery discharge preventing method for a hybrid vehicle according to an embodiment of the present invention.

FIG. 1 is a view showing each component of a battery discharge preventing system for a hybrid vehicle according to a first embodiment of the present invention.

As shown in FIG. 1, the battery discharge preventing system for the hybrid vehicle according to a first embodiment of the present invention includes a high voltage battery 100, a low voltage battery 110, a first voltage sensor 120, a second voltage sensor 130, a converter 30, a first relay 35, and a control unit 40.

Specifically, the high voltage battery 100 is a component that supplies a power supply to the inverter 20 to drive the motor 10 of the vehicle, and the low voltage battery 110 supplies power to a black box 200 mounted in the vehicle.

The first voltage sensor 120 measures a voltage level of the low voltage battery 110, and the second voltage sensor 130 measures a voltage level of the high voltage battery 100.

In addition, the converter 30 may be connected to a power supply path for connecting the high voltage battery 100 and the inverter 20 to charge the low voltage battery 110 through the high voltage battery 100.

In this instance, on a connection path that connects a power supply path for connecting the converter 30 and the high voltage battery 100, the first relay 35 selectively regulates a current path of the high voltage battery 100, and the control unit 40 controls the first relay 35 according to a measurement value of the first voltage sensor 120. Meanwhile, the control unit 40 may be independently provided as shown in FIG. 1, or may be provided to be built in the converter 30 or the inverter 20.

A battery discharge preventing method using the battery discharge preventing system for the hybrid vehicle according to the first embodiment of the present invention includes operation S10 for measuring a voltage level of the low voltage battery, operation S20 for determining a voltage level of the high voltage battery, and operation S30 for supplementing power of the low voltage battery.

Specifically, in operation S10 for measuring the voltage level of the low voltage battery, a process of measuring a voltage level of the low voltage battery 110 for supplying power to the black box 200 using the first voltage sensor 120 is performed.

That is, the low voltage battery 110 continuously measures the voltage level of the low voltage battery 110 in a state in which power is supplied to the black box 200 while the vehicle is parked or stopped. In this instance, when the voltage level of the low voltage battery 110 is reduced to a predetermined first reference value or less, the control unit 40 may supplement the power of the low voltage battery 110 using the high voltage battery 100 by connecting the first relay 35.

Thus, the low voltage battery 110 may continuously receive power from the high voltage battery 100, thereby enabling long time operation of the black box 200.

Meanwhile, between operation S10 for measuring the voltage level of the low voltage battery and operation S30 for supplementing the power of the low voltage battery, operation S20 for determining a voltage level of the high voltage battery may be further included.

In the present operation S20, the voltage level of the high voltage battery 100 may be determined, and when it is determined that the voltage level of the high voltage battery 100 is a second reference value or more, operation S30 for supplementing the power of the low voltage battery may be performed.

That is, whether the high voltage battery 100 is in a state capable of supplementing power may be determined to assist the power of the low voltage battery, and therefore it is possible to prevent discharge of the high voltage battery 100.

The present operation S20 may be performed by the second voltage sensor 130, but may be performed through measurement of state of charge (SOC) level.

Meanwhile, after operation S30 for supplementing the power of the low voltage battery, operation S40 for measuring the voltage level of the high voltage battery and operation S50 for cancelling connection of the first relay may be further performed.

Figure 3:
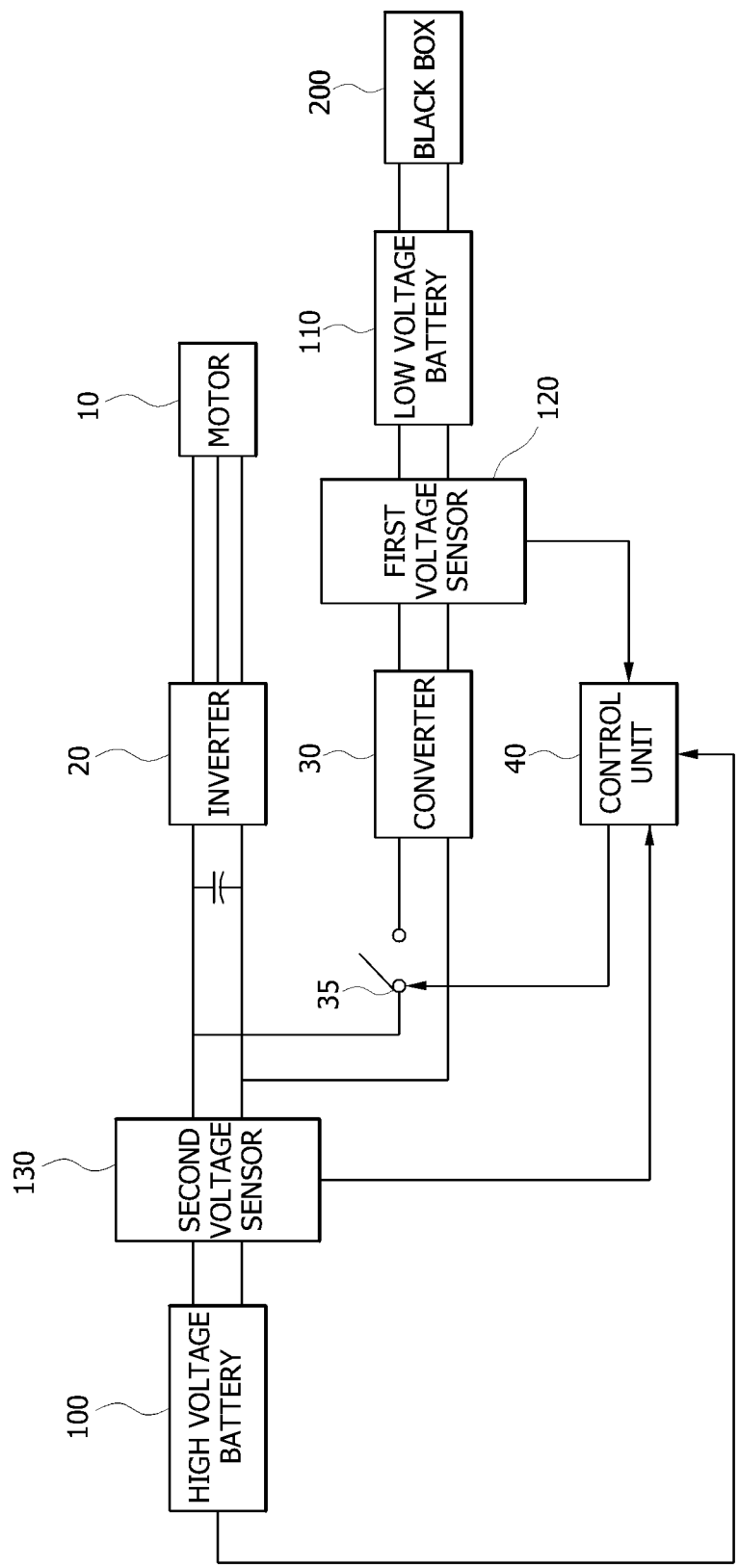
FIG. 3 is a view showing a state in which connection of a first relay is cancelled in a battery discharge preventing system for a hybrid vehicle according to an embodiment of the present invention.

That is, in a state in which power is supplied to the low voltage battery 110 using the high voltage battery 100, the voltage level of the high voltage battery 100 may be gradually reduced. Thus, when the voltage level of the high voltage battery 100 is detected to be a predetermined second reference value or less by the second voltage sensor 130, the control unit 40 may cancel the connection of the first relay 35 as shown in FIG. 3. As a result, it is possible to prevent discharge of the high voltage battery 100.

The first embodiment of the present invention has been described above, and hereinafter, a second embodiment of the present invention will be described.

Figure 4:
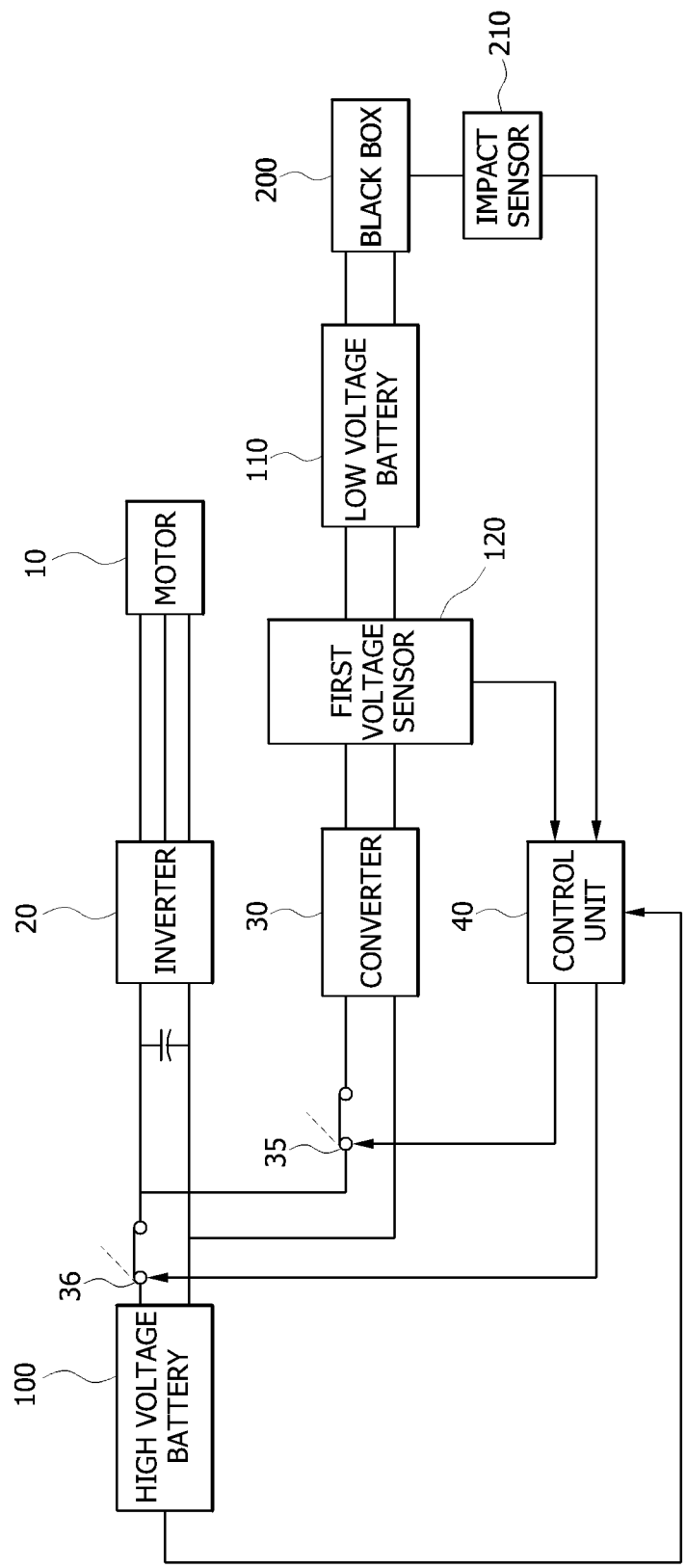
FIG. 4 is a view showing each component of a battery discharge preventing system for a hybrid vehicle according to a second embodiment of the present invention.

FIG. 4 is a view showing each component of a battery discharge preventing system for a hybrid vehicle according to a second embodiment of the present invention.

As shown in FIG. 4, the battery discharge preventing system for the hybrid vehicle according to the second embodiment of the present invention may have the same components as those in the first embodiment of the present invention.

However, there are differences between the first and second embodiments of the present invention in that an impact sensor 210 is further provided and the control unit 40 controls the first relay 35 by reflecting a measurement value of the impact sensor 210.

Specifically, in the second embodiment, when collision of the vehicle is detected by the impact sensor 210 in a state in which the high voltage battery 100 supplement the power of the low voltage battery 110, the control unit 40 cancels connection of the first relay 35. Here, the impact sensor 210 may be independently mounted in the vehicle, may be included in the black box 200 as shown in FIG. 4, or may be included in an air bag device.

Thus, according to the second embodiment, it is possible to prevent a risk to a driver due to the high voltage battery 100 at the time of collision of the vehicle, and protect a hybrid system.

Meanwhile, according to the second embodiment of the present invention, a second relay 36 may be further disposed in the path for connecting the high voltage battery 100 and the inverter 20, and when the collision of the vehicle is detected by the impact sensor 210, the control unit 40 may cancel connection of the second relay 36, and therefore it is possible to more reliably protect the hybrid system even when the collision of the vehicle occurs while the vehicle is parked or stopped.

In addition, the control unit 40 may discern a degree of collision of the vehicle or a degree of damage to the vehicle using signals received from the impact sensor 210 at the time of collision of the vehicle, and selectively control at least one of the first relay 35 and the second relay 36 based on the discerned information.

The battery discharge preventing system for the hybrid vehicle according to the present invention and the battery discharge preventing method using the same may have the following effects.

First, it is possible to attain long time operation of the black box even while the vehicle is parked or stopped in which the engine of the vehicle is stopped and the ACC power supply are turned off.

Second, a relay device may be selectively controlled by a converter control unit, and therefore it is possible to prevent discharge of the battery caused by long time operation of the black box when the vehicle is parked or stopped.

Third, it is unnecessary to additionally mount an auxiliary battery for black box, thereby reducing costs.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A battery discharge preventing method for a hybrid vehicle, comprising:
   measuring, by a first voltage sensor, a voltage level of a low voltage battery for supplying electric power to an electric device installed in the hybrid vehicle;
   sensing, by an impact sensor, a collision of the hybrid vehicle;
   comparing, by a control unit, the voltage level of the low voltage battery to a first reference value;
   controlling a first relay, by the control unit, to provide a connection between the low voltage battery and a high voltage battery, when the measured voltage level of the low voltage battery is equal to or lower than the first reference level; and
   determining whether the connection between the low voltage battery and the high voltage battery is established,
   wherein the high voltage battery supplies electric power to a motor to drive the hybrid vehicle, via an inverter connected to the motor, and
   wherein, when the connection is established, the control unit controls the first relay to disconnect the connection between the low voltage battery and the high voltage battery when the collision of the hybrid vehicle is sensed.

2. The battery discharge preventing method of claim 1, further comprising:
   measuring, by a second voltage sensor, a voltage level of the high voltage battery; and
   comparing, by the control unit, the voltage level of the high voltage battery to a second reference value,
   wherein, when the connection is established, the control unit controls the first relay to maintain the connection between the low voltage battery and the high voltage battery when the measured voltage level of the high voltage battery is equal to or higher than the second reference value, and
   wherein, when the connection is established, the control unit controls the first relay to disconnect the connection between the low voltage battery and the high voltage battery, when the measured voltage level of the high voltage battery is lower than the second reference value.

3. The battery discharge preventing method of claim 1, wherein the control unit controls a second relay to disconnect a connection between the high voltage battery and the inverter connected to the motor of the hybrid vehicle, when the collision of the hybrid vehicle is sensed.

4. A battery discharge preventing system for a hybrid vehicle, comprising:
   a high voltage battery configured to supply electric power to a motor of the hybrid vehicle;
   a low voltage battery configured to supply electric power to an electric device installed in hybrid vehicle;
   a first voltage sensor configured to measure a voltage level of the low voltage battery;
   a converter configured to convert the electric power of the high voltage battery to the electric power of the low voltage battery;
   a first relay configured to regulate a current path between the high voltage battery and the converter;
   an impact sensor configured to detect a collision of the hybrid vehicle; and
   a control unit configured to
      receive the measured voltage levels of the low voltage battery and high voltage battery,
      compare the measured voltage levels with a first reference value and a second reference value, and
      control the first relay to regulate the current path between the high voltage battery and the converter,
   wherein the control unit is configured to
      control the first relay to provide a connection between the low voltage battery to the high voltage battery via the converter to charge the low voltage battery using the high voltage battery when the measured voltage level of the low voltage battery is equal to or lower than the first reference value, and
      control the first relay to disconnect the connection between the high voltage battery and the low voltage battery when the collision of the hybrid vehicle is sensed by the impact sensor.

5. The battery discharge preventing system of claim 4, further comprising:
   a second voltage sensor configured to measure a voltage level of the high voltage battery,
   wherein the control unit controls the first relay to disconnect the connection between the high voltage battery and the low voltage battery when the measured voltage level of the high voltage battery is lower than the second reference value.

6. The battery discharge preventing system of claim 5, further comprising:
- an inverter configured to receive the electric power from the high voltage battery and drive the motor of the vehicle; and
- a second relay configured to selectively regulate a current path between the high voltage battery and the inverter,
- wherein the control unit is configured to control the second relay to selectively regulate the current path between the high voltage battery and the inverter based on the detected collision of the hybrid vehicle.

\* \* \* \* \*